May 20, 1969     H. L. ERICKSON     3,444,897
REVERSIBLE FLOW CONTROL DEVICE
Filed Feb. 28, 1967
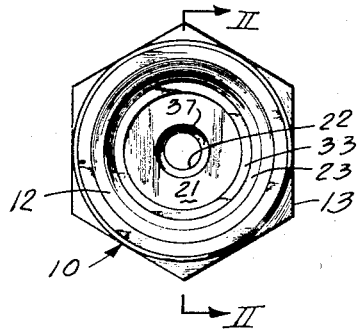
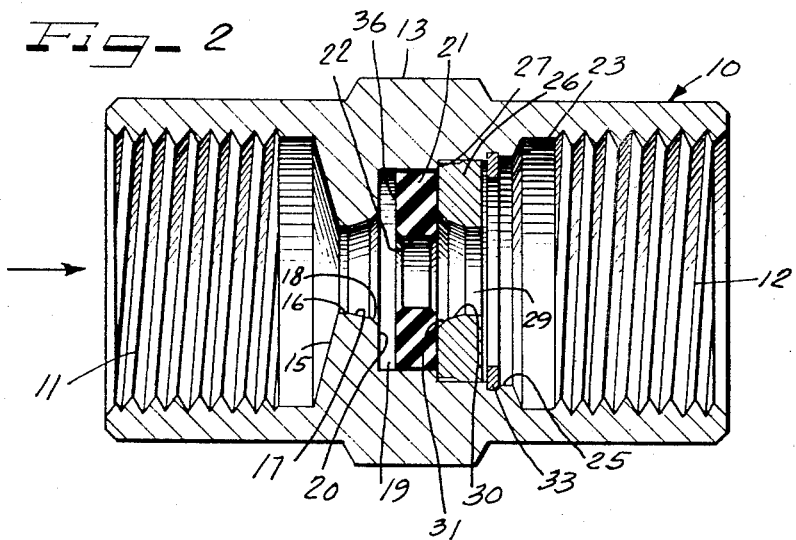
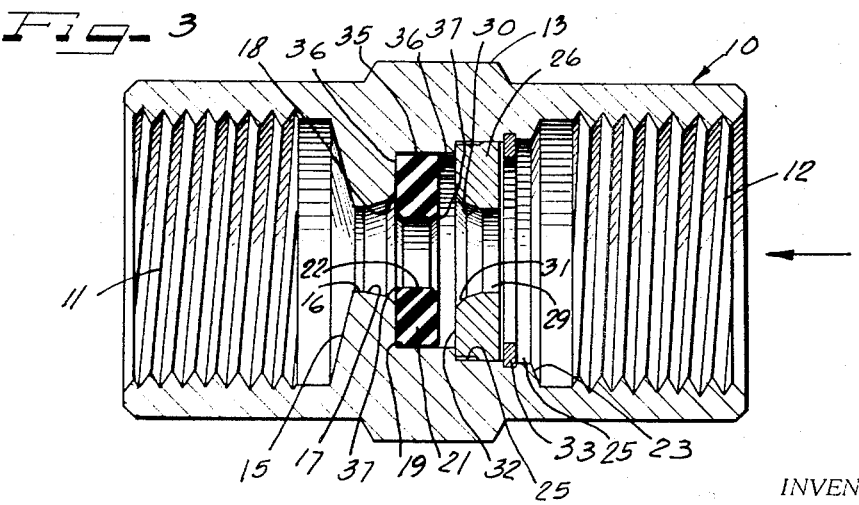
INVENTOR.
HOWARD L. ERICKSON
BY *Hill, Sherman, Meroni, Gross & Simpson* ATTORNEYS United States Patent Office 3,444,897
Patented May 20, 1969

3,444,897
REVERSIBLE FLOW CONTROL DEVICE
Howard L. Erickson, Bensenville, Ill., assignor to The Dole Valve Company, Morton Grove, Ill., a corporation of Illinois
Filed Feb. 28, 1967, Ser. No. 619,224
Int. Cl. F15d 1/02
U.S. Cl. 138—45         3 Claims

ABSTRACT OF THE DISCLOSURE

Reversible flow control device including a casing in the form of a pipe fitting having a flow control chamber intermediate the ends of the fitting. The flow control chamber contains a resilient flow control annulus. Facing seats are provided at opposite ends of the chamber having converging passageways leading from the chamber. The flow control annulus flexes along an associated seat in accordance with the direction of flow of fluid through the fitting, to restrict the cross-sectional area of the orifice through the flow control annulus as pressure drop through the orifice increases.

*Background of the invention and general description of the prior art*

Uniform rate of flow control devices in which deformable annular flow control members flexing into the frusto-conical wall of a converging passageway have heretofore been used to maintain a uniform rate of flow fluid throughout a wide range of pressure variations. One such flow control device is shown and described in Patent No. 2,454,929 which issued to Leslie A. Kempton on November 30, 1948.

Such flow control devices have been contained in a fitting, internally threaded at each end, and having a hex-intermediate portion engaged by a wrench when assembling the fitting in a pipe line.

With such flow control devices the annular flow control member must be properly assembled in the fitting so the fluid will exert pressure on the proper side of the flow control device in order to attain a uniform rate of flow of fluid through the fitting. The fitting must also be properly assembled in the piping connections and even though the direction of flow through the fitting may be marked, these flow control fittings are frequently assembled in the wrong direction and the annular flow control devices are also many times improperly assembled in the fittings with the result that they afford little or no control in the flow of fluid through the fitting.

It is also frequently desirable to reverse the flow through the fitting and when reversing the flow, to attain a uniform rate of flow in each direction of flow of fluid through the fitting, as in cases where fluid may be supplied for cooling or other purposes and it is then desired to reuse the fluid, and when reusing the fluid, provide a uniform rate of flow, as fluid flows through the fitting in an opposite direction.

*Summary of invention and objects*

The present invention, therefore, attains a uniform rate of flow through a fitting in reverse directions of flow through the fitting in a simple and effective manner, making it impossible to assemble either the flow control or the fitting in the wrong direction, and to enable the fitting to be used in cases where fluid flows through the fitting in one direction for one purpose and then flows through the fitting in an opposite direction for the same purpose, and the rate of flow through the fitting must be the same in each direcion of flow.

A principal object of the present invention, therefore, is to provide a simple and effective uniform rate of flow control device, providing a uniform rate of flow of fluid over a wide range of pressure variations, effective to provide the same rate of the flow of fluid through the fitting when flowing through the fitting in one direction and then reversing its flow through the fitting.

Another object of the inventon is to provide a novel and simple form of rate of flow control device for fluids, in which the device need not be assembled in a required direction to attain the required uniform rate of flow.

Another object of the invention is to provide a simpler and more efficient form of rate of flow control device, in which a uniform rate of flow is attained through a fitting in reverse directions of flow of fluid through the fitting over a wide range of pressure variations, by the use of a resilient annular flow control device, seated in the fitting against one of a pair of spaced seats, dependent upon the direction of flow of fluid through the fitting.

*Description of the drawing*

FIGURE 1 is an end view of one form of flow control device constructed in accordance with the principles of the present invention;

FIGURE 2 is a cross sectional view taken through the flow control device shown in FIGURE 1 substantially along line II—II of FIGURE 1; and FIGURE 3 is a cross sectional view taken through a flow control device like the device shown in FIGURE 1, but showing a reversal in flow of fluid through the device.

*Description of the preferred embodiment of the invention*

In the embodiment of the invention illustrated in the drawing, I have shown a casing 10, which may be in the form of a pipe fitting internally threaded at each end as indicated by reference characters 11 and 12, and having an exterior intermediate hex-portion 13 formed integrally therewith and affording a means for assembling the fitting into a pipe line by a wrench or the like.

The threaded end 11 of the flow control fitting 10 terminates into a frusto-conical surface 15, converging to a short cylindrical passageway 16. The cylindrical passageway 16 in turn terminates into two frusto-conical surfaces 17 and 18 which diverge to a flow control chamber 19. The frusto-conical surface 18 terminates into a seat 20 for a resilient flow control annulus 21. The frusto-conical surface passageway 18 is shown as being at a greater angle with respect to a line extending axially through the center of the fitting than the frusto-conical surface 17 to accommodate a flow control annulus 21, resting on the seat 20, to flex into said passageway and effect a reduction in the diameter of a central orifice 22 leading therethrough, as fluid flows into the fitting through the threaded end portion 12 thereof at sufficient pressure to press the flow control annulus against the seat 20 and distort the flow control annulus into the frusto-conical surface 18 to thereby restrict the cross sectional area of the upstream end of said orifice.

The threaded end 12 terminates into a frusto-conical passageway 23, which converges to a stepped interior cylindrical wall 25, the small diameter end of which extends to and is larger than the diameter of the flow control chamber 19. An insert 26 fits within the small diameter portion of the stepped cylindrical wall 25 into abutting engagement with a shoulder 27 at the termination of the stepped passageway 25 with the flow control chamber 19. The insert 26 has a relatively short generally cylindrical passageway 29 leading thereinto terminating in two frusto-conical surfaces 30 and 31 like the frusto-conical surfaces 17 and 18. The inner end of the insert 26 forms a seat for the flow control member 21 as fluid under pressure flows through the threaded end 11 of the fitting, and the frusto-conical surfaces 31 and 30 form converging walls into which the flow control annulus 21 may flex, to effect a reduction in the cross sectional area of the upstream end of the orifice 22 upon increases in pressure, with a resultant uniform rate of flow through the fitting from the inlet 11, over a wide range of pressure variations. A snap ring 33 is snapped within the stepped cylindrical passageway 25 to retain the insert 26 in position in said stepped passageway, it being understood that the insert 26 is pressed into the stepped passageway with a press fit into engagement with the shoulder 27. The snap ring 33, therefore, is provided as a safety measure.

The resilient flow control annulus 21 may be made from rubber, an elastomer or a like material and has an exterior cylindrical wall 35 spaced radially inwardly of the wall of the flow control chamber 19 and opposite parallel flat faces 36 seating against either of the seats 20 or 32, dependent upon the direction of flow of fluid through the fitting. The central orifice 22 leading through the flow control annulus has diverging frusto-conical surfaces 37, 37 at its opposite ends, to provide flared entering ends for the orifice 22, in each direction of flow of fluid through said orifice.

The resilient flow control annulus 21 is thus deformed into the frusto-conical surfaces 18 and 17, or 30 and 31 depending upon the direction of flow through the fitting as fluid under pressure is introduced to either end of the fitting. The extent of deformation of the flow control annulus depends upon the pressure drop across the orifice 22, and as the flow control member is deformed along either seat 20 or 32 into their respective converging frusto-conical passageways, the sides of the orifice 22 at the upstream side of the flow control member will decrease to the extent required to attain a uniform rate of flow through the fitting, in each direction of flow of fluid through the fitting.

While I have herein shown and described one form in which the invention may be embodied, it may readily be understood that variations and modifications in the invention may be attained without departing from the spirit and scope of the novel concepts thereof.

I claim as my invention:

1. In a uniform rate of flow control device for maintaining a uniform delivery rate over a wide range of pressure variations in reverse directions of flow through the device,
   an open ended casing having aligned inlets and outlets adapted for the flow of fluid therethrough from either end thereof,
   a central flow control chamber in said casing intermediate the ends thereof and having,
      axially spaced seats extending perpendicular to the axis of said chamber and defining the opposite ends of said flow control chamber, said seats having aligned generally frusto-conical converging passageways leading therethrough from opposite ends of said chamber,
   a resilient flow control annulus in said flow control chamber between said seats and spaced inwardly from the wall thereof and having a central flow control orifice leading therethrough,
   said flow control annulus being adapted to seat against either of said seats dependent upon the direction of flow through said casing, and being deformable into an associated frusto-conical passageway leading through an associated seat, upon increases in pressure on the upstream side of said flow control member,
   said casing on one side of said flow control chamber having an interior cylindrical wall of larger diameter than the diameter of said flow control chamber and the juncture of said wall with said flow control chamber defining a shoulder,
   the seat at one end of said flow control chamber being formed integrally with said casing,
   the seat at the opposite end of said flow control chamber being an insert fitted along said cylindrical wall into engagement with said shoulder, and
   means retaining said insert to said cylindrical wall.

2. The structure of claim 1,
   wherein the frusto-conical converging passageways leading from the seats are formed from a pair of frusto-conical surfaces of different angles, one frusto-conical surface leading directly from the seat being at a greater angle to an axial line extending through the center of the casing than a second frusto-conical surface extending from the downstream end thereof, and
   wherein a snap ring is snapped into said wall to retain said insert thereto.

3. The structure of claim 1,
   wherein each end of said casing is internally threaded,
   wherein one threaded end leads to a frusto-conical wall converging into a cylindrical wall terminting into the downstream end of one frusto-conical converging passageway,
   wherein the frusto-conical passageways are formed from adjoining frusto-conical surfaces of lesser and greater angles with respect to the axis of said casing,
   wherein the frusto-conical surface of greater angle opens to said flow control chamber, and terminates at said seat formed integrally with said casing,
   wherein the opposite threaded end leads to said interior cylindrical wall of a larger diameter than said flow control chamber,
   wherein the insert is press fitted along said wall to engage said shoulder and has the two frusto-conical converging surfaces formed therein and leading therethrough, and
   wherein the means retaining said insert to said frusto-conical wall is a snap ring snapped into said wall to retain said insert thereto.

References Cited

UNITED STATES PATENTS

| | | | |
|---|---|---|---|
| 2,454,929 | 11/1948 | Kempton | 138—45 |
| 2,500,750 | 3/1950 | Halenza | 138—45 XR |
| 2,572,244 | 10/1951 | Chace | 138—45 XR |
| 2,728,355 | 12/1955 | Dahl | 138—45 |
| 2,775,984 | 1/1957 | Dahl | 138—45 |
| 2,899,979 | 8/1959 | Dahl et al. | 138—45 |

ROBERT R. MACKEY, *Primary Examiner.*

U.S. Cl. X.R.

166—192; 220—24.5.